April 3, 1928.  1,665,091
W. H. GOYNE
FLYING MACHINE
Filed May 5, 1927   4 Sheets-Sheet 1

WITNESSES

INVENTOR
W. H. Goyne
BY
ATTORNEY

April 3, 1928.  W. H. GOYNE  1,665,091

FLYING MACHINE

Filed May 5, 1927  4 Sheets-Sheet 2

WITNESSES

INVENTOR
W. H. Goyne
BY
ATTORNEY

April 3, 1928.
W. H. GOYNE
FLYING MACHINE
Filed May 5, 1927
1,665,091
4 Sheets-Sheet 3
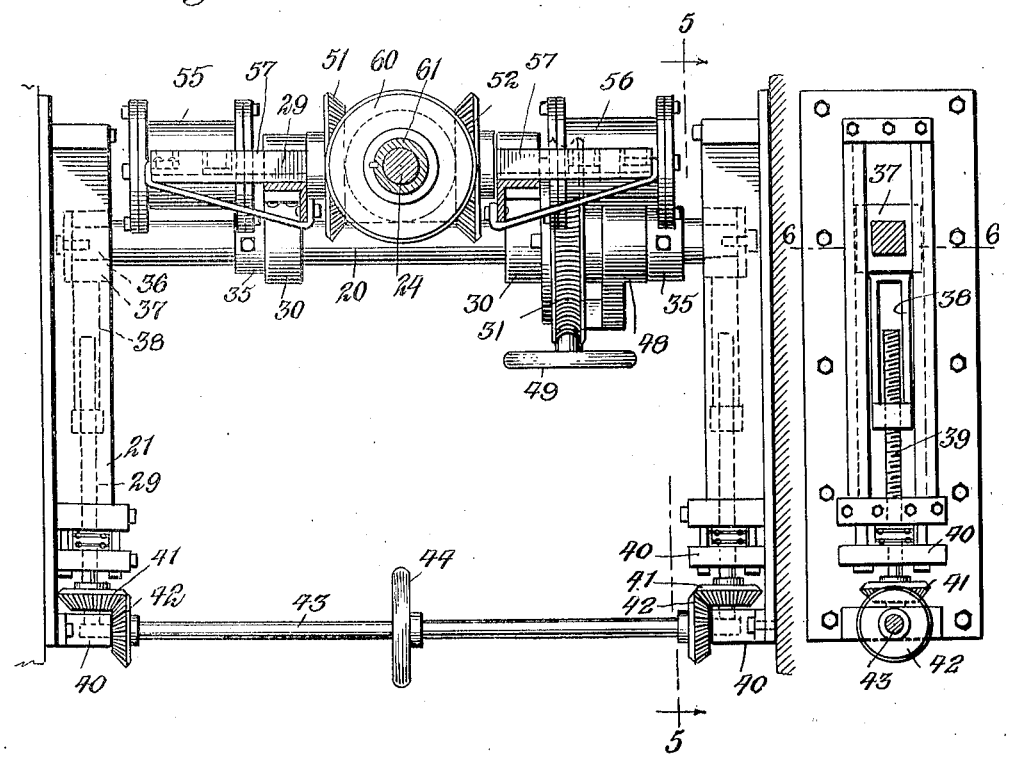
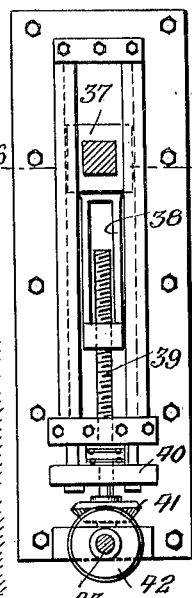
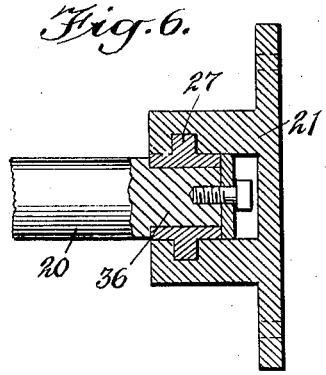
WITNESSES
INVENTOR
W. H. Goyne
BY
ATTORNEY April 3, 1928.

W. H. GOYNE

FLYING MACHINE

Filed May 5, 1927

WITNESSES

INVENTOR
W. H. Goyne
BY
ATTORNEY

Patented Apr. 3, 1928.

1,665,091

UNITED STATES PATENT OFFICE.

WILLIAM H. GOYNE, OF TILLAMOOK, OREGON.

FLYING MACHINE.

Application filed May 5, 1927. Serial No. 188,956.

The present invention is concerned with the provision of a flying machine of the helicopter type equipped with propellers turning on vertical axes to lift the machine directly upwardly, as well as with the usual puller propeller turning on a horizontal axis.

An object of the invention is to provide a machine of this character in which two oppositely rotating lifting propellers are provided, these propellers gyroscopically counterbalancing each other to facilitate handling of the aeroplane at times when its direction of movement is shifted from a vertical to the horizontal direction.

Another object of the invention is to provide means for utilizing one or both of the lifting propellers to propel the plane in a forward direction.

Another object of the invention is to provide an aeroplane in which the lifting propellers, their engine, and their transmission gearing are mounted as a unit for adjustment longitudinally of the body of the aeroplane, so that the vertical axis of rotation of the propellers may be shifted to coincide with the center of gravity of the plane under varying loads which may be carried by the plane.

Still another object of the invention is to arrange the unit consisting of the propellers, engine and transmission gearing for tilting movement about a horizontal axis, and to so balance the weight of the unit that this tilting movement will not alter the center of gravity of the aeroplane.

Other objects of the invention are to provide an aeroplane of the helicopter type of simple, practical construction, which will be rugged, durable and efficient in use, and capable of operation by an unskilled pilot.

With the above noted and other objects in view, the invention consists in certain novel features of construction and combinations and arrangements of parts, as will be more fully hereinafter set forth and pointed out in the claims. The invention may be more fully understood from the following description in connection with the acompanying drawings, wherein—

Fig. 4 is a sectional plan view on the line 4—4 of Fig. 3.

Fig. 5 is a sectional view on the line 5—5 of Fig. 4.

Fig. 6 is an enlarged sectional detail on the line 6—6 of Fig. 5.

Figure 1:
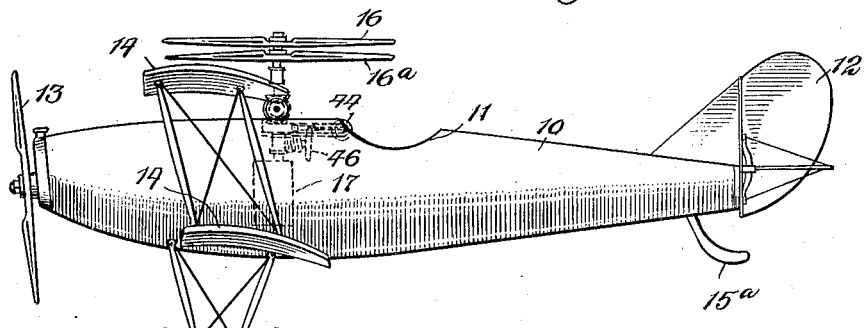
Fig. 1 is a view in side elevation of an aeroplane embodying the present invention.
Figure 2:
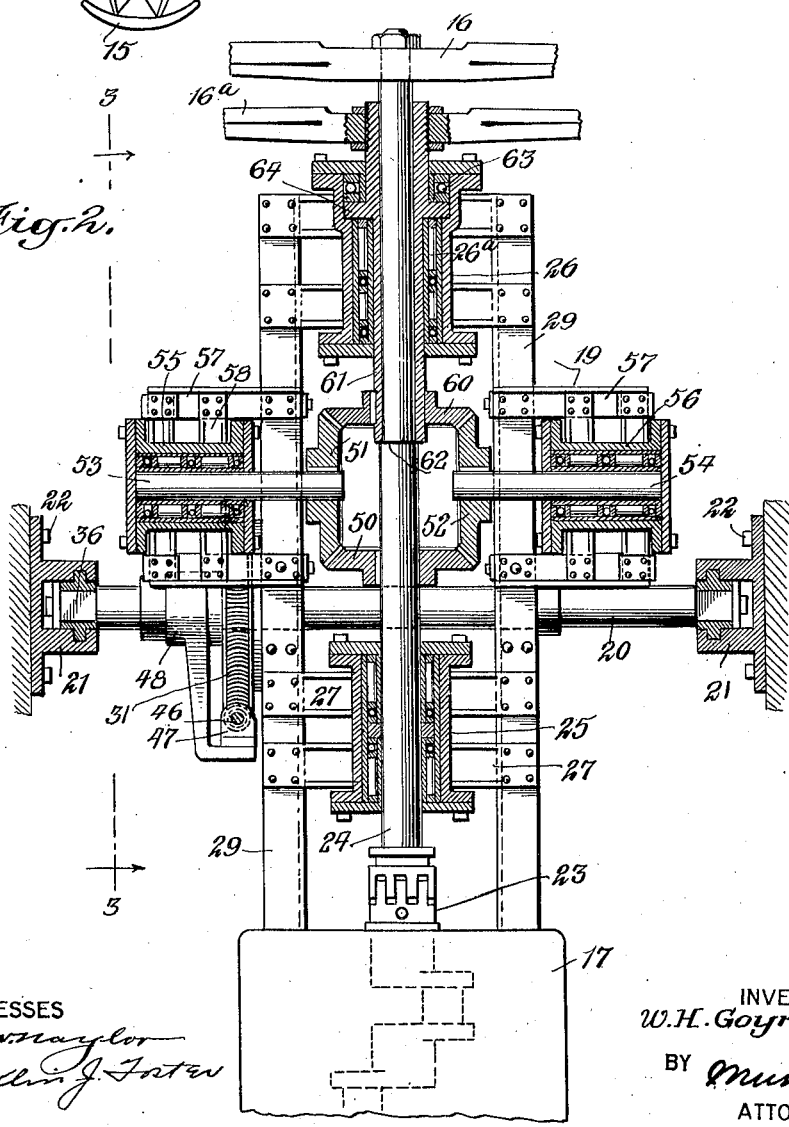
Fig. 2 is a vertical sectional view through the transmission gearing for the vertical propellers and the associated parts of the aeroplane.
Figure 3:
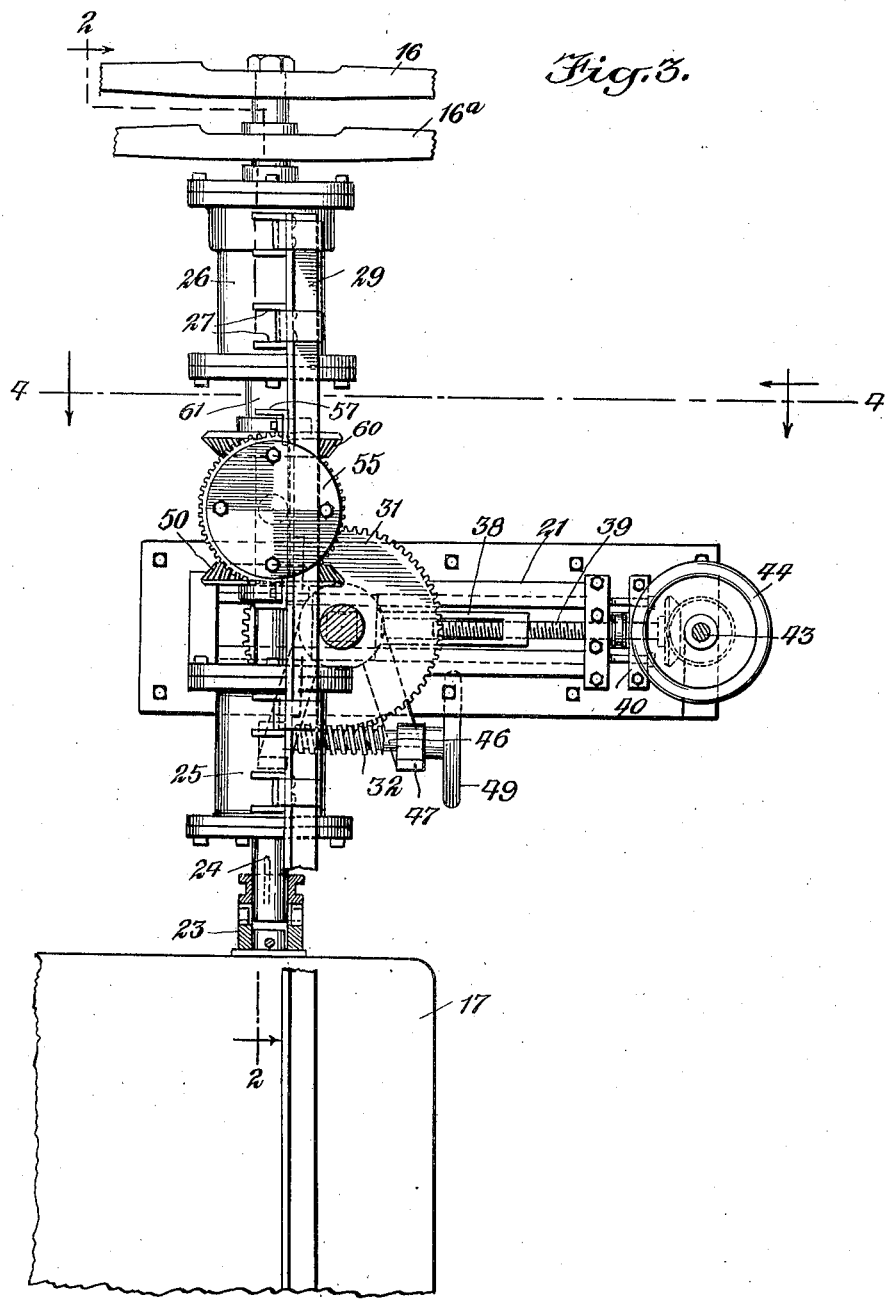
Fig. 3 is a view mainly in side elevation taken approximately on the line 3—3 of Fig. 2.

In Fig. 1 of the drawings, I have shown an aeroplane constructed in accordance with the present invention. The aeroplane in its general shape and appearance is more or less conventional including the usual tapered body portion 10 providing a passenger compartment 11. The tail rudder is indicated at 12, and the usual puller type propeller at 13 driven by any suitable motor (not shown). The illustrated plane is of the biplane type formed with pairs of wings 14 projecting from opposite sides of the body, and having the usual landing gear 15 and tail skid 15ª.

The present invention is principally concerned with the provision of a pair of oppositely rotating lifting propellers 16 and 16ª arranged above the body and driven through suitable transmission gearing from a motor 17. The propellers 16 and 16ª together with their transmission mechanism and controlling mechanism are mounted in a skeleton frame 19 arranged for pivotal adjustment about a centrally disposed horizontal shaft 20, the ends of which are arranged for fore and aft sliding adjustment in a pair of guides 21 secured to the interior of the aeroplane body in any convenient or conventional manner, as for instance by the bolts 22.

The main shaft of the engine 17 may be permanently connected by a clutch 23 to a driving shaft 24, this clutch permitting the necessary end play between shaft 24 and the shaft of the delicate engine. The journal boxes 25 and 26 of the shaft 24 are integral with cross braces 27 riveted or otherwise secured at 28 to the spaced parallel upright angle iron frame bars 29 of the main frame. The frame bars 29 are bolted to collars 30 turning freely on the shaft 20, and one of the collars is made rigid in any suitable manner with a worm gear 31 also mounted to turn on the shaft 20, and actuated by a screw 32 to tilt the frame 19 about the shaft 20. Collars 30 are held against sliding movement along the shaft 20 by stationary collars 35.

The ends of the shaft 20 are squared as at 36, fitting in slide members 37 which are keyed to slide along the guideway 21. Slides 37 include yoke-like extensions 38 through which work the threaded ends of shafts 39, said shafts being journalled in suitable bearings 40 and carrying bevelled pinions 41 meshing with bevelled pinions 42 on an adjusting shaft 43 disposed in parallelism with the shaft 20 and having its ends borne in certain of the bearing blocks 40. The shaft 43 may be rotated by a hand wheel 44. The shaft 46 which carries screw 32 is journalled in bearing brackets 47 integral with a hanger 48 hung on the shaft 20.

From the foregoing description it will be seen that the shaft 20 and the mechanism which it carries may be tilted about the shaft 20 by rotating a hand wheel 49 on the screw shaft 46, and that the shaft 20 with the mechanism which it carries may be bodily slid along the guideways 21 through the mechanism controlled by the hand wheel 44.

The frame bars 29 of the frame 19 are preferably rigidly secured to the engine 17. The shaft 24 is borne in the lower journal box 25, extends through the upper journal box 26 and mounts the upper lifting propeller 16. Rigidly secured to this shaft is a bevelled pinion 50 meshing with a pair of bevelled idler pinions 51, 52 keyed to horizontal shafts 53, 54 mounted in journal boxes 55, 56 carried by lateral skeleton extensions of the frame 19, these extensions preferably including pairs of spaced horizontal angle iron frame bars 57 bolted to the frame bars 29 and connected by transverse vertical frame bars 58 rigidly or integrally connected to the journal boxes 55 and 56. The idler gears 51 and 52 mesh with a pinion 60 on a hollow shaft 61 encircling the upper end of the shaft 24, and seating on a shoulder 62 thereof. The upper journal box 26 in addition to mounting roller bearings 26ᵃ similar to the roller bearings mounted by the other journal boxes, carries a thrust bearing 63 coacting with a flange or shoulder 64 fixed to the hollow shaft 61. Shaft 61 at its upper end mounts the lower lifting propeller 16ᵃ. Preferably the gears 50, 60 and the pinions 51, 52 are of the same diameter so that when the idlers 51, 52 are in mesh with the gears 50, 60, shaft 61 will be driven at the same speed as the shaft 24 but in an opposite direction.

Figures 7, 8:
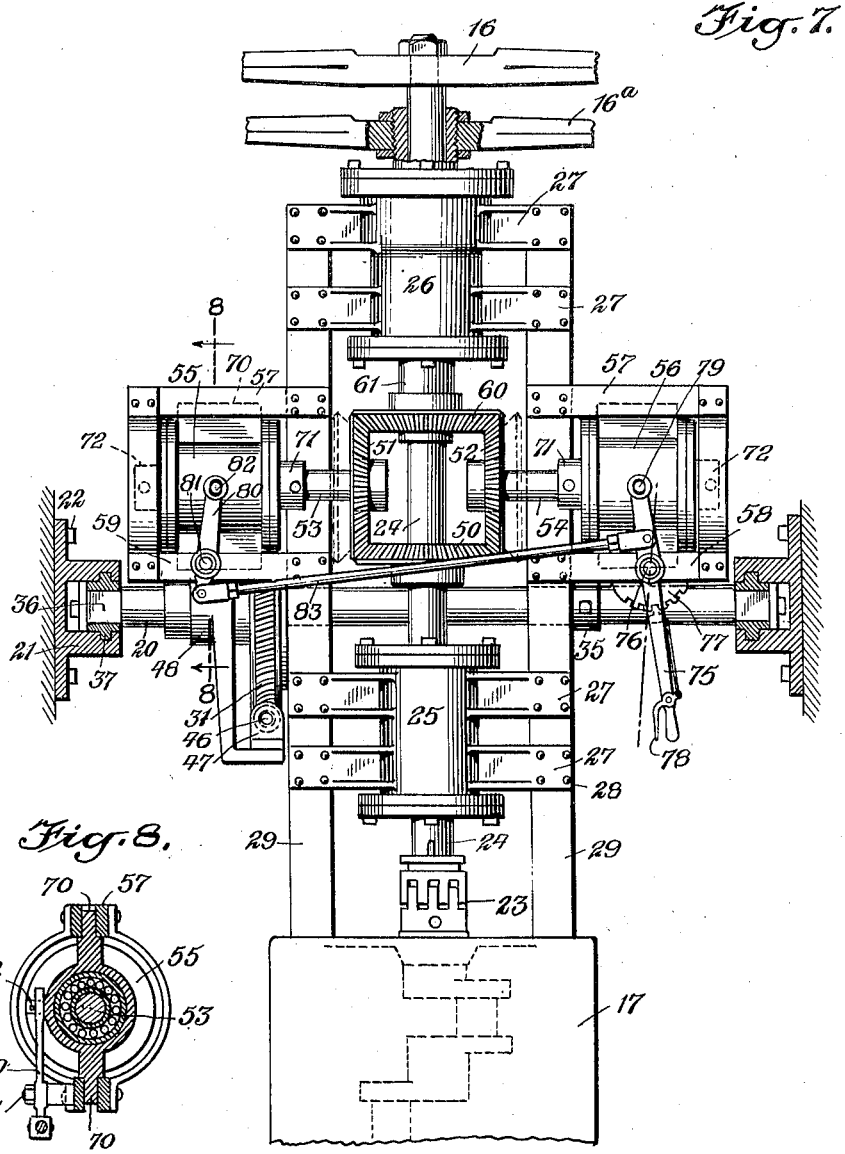
Fig. 7 is a view in side elevation illustrating a slight modification of the mechanism shown in Fig. 2.
Fig. 8 is a transverse sectional view on the line 8—8 of Fig. 7.

I may find it desirable to provide means for selectively uncoupling the shaft 61 from the shaft 24, so that the upper propeller 16 may be driven independently of the lower propeller 16ᵃ, and in Fig. 7 I have illustrated means for selectively effecting such uncoupling. In this figure, it will be noted that the journal boxes 55 and 56, instead of being rigidly secured to the frames 57, 58 are mounted for sliding movement as by keyes 70 in guideways defined by the bars 57. Collars 71, 72 on the shafts 53, 54 of the idler gears 51, 52 prevent sliding movement of the journal boxes 55, 56 independently of the shafts 53, 54 which they carry. Means is provided for shifting the journal boxes 55 and 56 outwardly away from the central shaft 24 to disengage the pinions 51 and 52 from the gears 50, 60. This means has been shown as a lever 75 fulcrumed at 76 on one of the lower frame bars 58 and at its free end being pivotally connected at 79 to the journal box 56. The usual sector plate 77 and latching means 78 is associated with the lever 75. A second lever 80 is pivoted to the opposite frame bar 58 adjacent the journal box 55 on a fulcrum 81. The free end of this lever engages journal box 55 at 82, and the opposite end of the lever is connected to lever 75 by a link 83. Thus, as the lever 75 is swung to the left in Fig. 7, it will act to effect relative separation of the two journal boxes 55, 56, uncoupling the gears 51, 52 and the gears 60, thereby permitting the upper propeller 16 to be driven independently of the lower propeller 16ᵃ.

The operation of the device is substantially as follows. When preparing to ascend, the shaft 20 is shifted along the guideways 21, 21, until it is approximately in the center of gravity of the loaded plane. The motor 17 which drives the propellers 16 and 16ᵃ is then started, and its speed increased until the airship is lifted slightly from the ground, at which time it can be accurately determined whether or not the airship is properly balanced. If the balance is incorrect, the position of the shaft 20 is adjusted by the hand wheel 44 until perfect balance is reached.

The speed of the motor 17 is then increased, whirling the propellers 16, 16ᵃ, and lifting the plane directly upwardly to the desired flying height. The motor which drives the propeller 13 will then be started, and when sufficient speed has been attained in forward flight, the lower propeller 16ᵃ of the lifting pair will be thrust out of gear by shifting the lever 75, the entire unit consisting of the engine 17. Propellers 16, 16ᵃ may then be tilted forwardly about the shaft 20 by rotating the hand wheel 49 and turning the worm 31 by the screw 32. The tilting of this unit forwardly about the shaft will in no way affect the proper balance of the plane, since the unit is so balanced on the shaft 20, that it might be completely rotated thereabout without affecting the balance in any manner. With the unit tilted forwardly, the upper propeller 16 may assist the propeller 13 to draw the plane forwardly.

When nearing the place of landing, motor 17 is stopped temporarily, lower propeller 16ª is thrown into gear, the unit which swings on the shaft 20 is restored to vertical position, and the two propellers 16 and 16ª are rotated until they attain sufficient speed to sustain the plane. The motor driving the propeller 13 will then be stopped, and the aeroplane will float directly downwardly at a speed determined by the speed of rotation of the propellers 16 and 16ª.

The construction above described not only has the usual advantages of the helicopter in that no running take-off is required, but will be exceedingly simple to handle and may be operated by an unskilled pilot. The use of the two propellers 16 and 16ª rotating in opposite directions, not only overcomes any gyroscopic tendency which one propeller might have when changing the direction of flight, but also prevents any tendency of the aeroplane body to start swinging in a circular path while the plane is rising directly upwardly or dropping directly downwardly.

I have not described in detail the construction of the journal boxes, or the manner of securing the guideways 21 to the aeroplane body, since obviously the exact design of these parts is subject to a wide range of variation.

In fact, numerous changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a flying machine of the helicopter type, a body, a horizontal shaft extending transversely of the body and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts.

2. In a flying machine of the helicopter type, a body, a horizontal shaft extending transversely of the body and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, the propeller shafts being nested and the transmission gearing being arranged to drive the shafts in opposite directions.

3. In a flying machine of the helicopter type, a body, a horizontal shaft extending transversely of the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, the propeller shafts being nested and the transmission gearing being arranged to drive the shafts in opposite directions, one of the propeller shafts being driven by the other, and means for selectively uncoupling the shafts, whereby to render one propeller inoperative.

4. In a flying machine of the helicopter type, a body, a horizontal shaft extending transversely of the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, the propeller shafts being nested and the transmission gearing being arranged to drive the shafts in opposite directions, the transmission gearing including pinions, both propeller shafts and idler gears connecting them, whereby one propeller shaft is driven from the other, shafts mounting the idler gears and journal boxes carried by the frame receiving the idler pinion shafts, said journal boxes being slidably mounted in the frame and held against sliding movement relatively to the idler pinion shafts, whereby one propeller shaft may be disengaged from the other by sliding the journal boxes.

5. In a flying machine of the helicopter type, a body, a horizontal shaft extending transversely of the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for bodily slidably adjusting the shaft fore and aft in the aeroplane body, whereby to dispose the frame and the mechanism which it carries at the center of gravity of the body.

6. In a flying machine of the helicopter type, a body, a horizontal shaft extending transversely of the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for bodily slidably adjusting the shaft fore and aft in the aeroplane body, whereby to dispose the frame and the mechanism which it carries at the center of gravity of the body, guideways fixed to the aeroplane body, slides in the guideways receiving the ends of the shaft, and screws for shifting the slides along the guideways.

7. In a flying machine of the helicopter type, a body, a horizontal shaft extending transversely of the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for bodily slidably adjusting the shaft fore and aft in the aeroplane body, whereby to dispose the frame and the mechanism which it carries at the center of gravity of the body, guideways fixed to the aeroplane body, slides in the guideways receiving the ends of the shaft, and screws for shifting the slides along the guideways, and a common hand wheel for simultaneously operating the screws.

8. In a flying machine of the helicopter type, a body, a horizontal shaft extending transversely of the body, and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for adjustably rotating the frame about the central axis of the shaft.

9. In a flying machine of the helicopter type, a body, a horizontal shaft extending transversely of the body, and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for adjustably rotating the frame about the central axis of the shaft, the shaft being held against turning movement, and mechanism for rotating the frame on the shaft.

10. In a flying machine of the helicopter type, a body, a horizontal shaft extending transversely of the body and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, means for adjustably rotating the frame about the central axis of the shaft, the shaft being held against turning movement, and mechanism for rotating the frame on the shaft, said mechanism including a worm wheel fixed to the frame and a screw engaging the worm wheel.

11. In a flying machine of the helicopter type, a body, a horizontal shaft extending transversely of the body and adjustable longitudinally on the body, a frame carried by the shaft, an engine, a pair of propeller shafts, and transmission gearing, all mounted on the frame, the frame being normally retained in proper position to dispose the propeller shafts in a substantially vertical plane, and propellers carried by the shafts, the frame being rotatable about the shaft, the propellers being mounted on one side of the shaft and the engine on the other side, whereby rotation of the frame about the shaft will not materially alter the center of gravity of the flying machine.

12. In a flying machine, a body, a horizontal shaft longitudinally adjustable on the body, a frame rotatably adjustable on the shaft, and a pair of lifting propellers carried by the frame.

13. In a flying machine, a body, a horizontal shaft longitudinally adjustable on the body, a frame rotatably adjustable on the shaft, a pair of lifting propellers carried by the frame, guideways mounted in the body of the machine and slides in the guideways carrying the shaft.

WILLIAM H. GOYNE.